June 26, 1951            R. PORTER            2,558,154
CULTIVATING IMPLEMENT
Filed Aug. 31, 1948
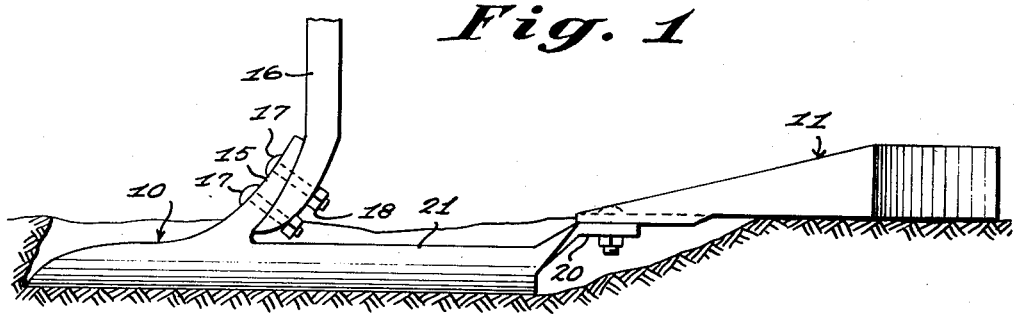
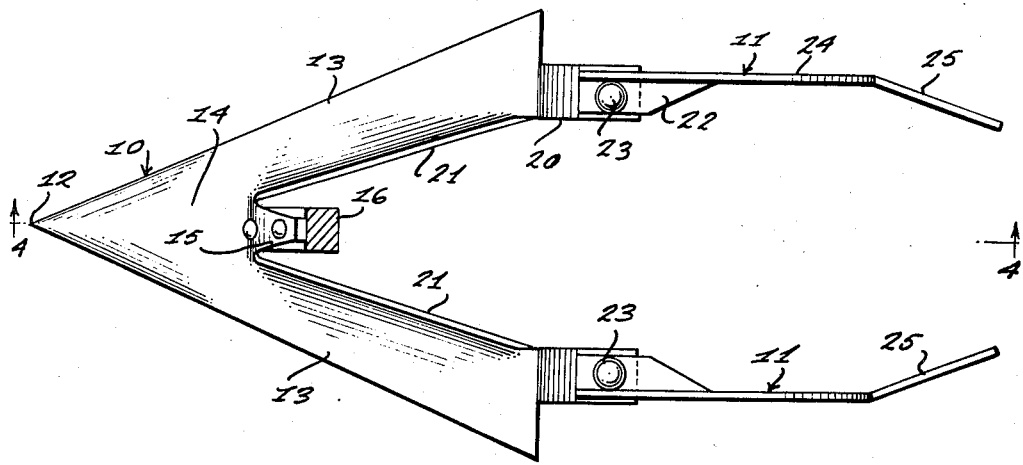
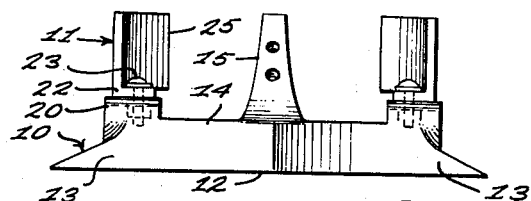
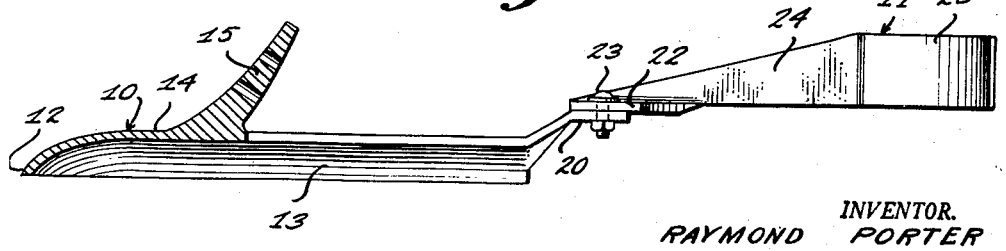
INVENTOR.
RAYMOND PORTER
BY
McMorrow, Berman & Davidson
ATTORNEYS

UNITED STATES PATENT OFFICE 2,558,154

CULTIVATING IMPLEMENT

Raymond Porter, Smithville, Mo.

Application August 31, 1948, Serial No. 46,951

1 Claim. (Cl. 97—205)

This invention relates to cultivating implements, and more particularly to an improved plow or sweep for cleaning and cultivating the middles between the rows of a row crop.

It is among the objects of the invention to provide an improved cultivating implement which will effectively destroy weeds and cultivate the soil in the middles between the rows of the row crop, which moves the soil first outwardly and then inwardly so that, although the soil is thoroughly worked, no definite furrow is left to interfere with the operation of a tractor in a subsequent cultivating operation, which is attachable to a conventional cultivator without modification of the cultivator structure, and which is simple and durable in construction and economical to manufacture.

Other objects and advantages will become apparent from a consideration of the following description and the appended claim in conjunction with the accompanying drawing, wherein:

Figure 1 is a side elevation of the improved implement shown in operative position relative to the soil upon which it operates;

Figure 2 is a top plan view of the implement;

Figure 3 is a front end elevation of the implement; and

Figure 4 is a longitudinal, medial cross-section taken substantially on the line 4—4 of Figure 2.

With continued reference to the drawing, the implement comprises, in general, a triangular, pointed cultivator shovel 10, and a pair of rearwardly-extending wings 11.

The shovel 10 comprises a unitary body of thin metal having a pointed front end 12 and side walls 13 which diverge symmetrically rearwardly from the pointed front end 12 and are upwardly and inwardly inclined relative to each other, and a curved top wall 14 extending between the side walls 13 from the front end of the shovel rearwardly for a distance less than the rearward extent of the side walls. A curved, apertured tang 15 projects upwardly from the rearward edge of the top wall 14 at the mid-length location of such rearward edge for attachment of the shovel to the shank 16 of a cultivator.

As is clearly shown in Figure 1, the cultivator shank 16 has a curved and tapered lower end provided with two spaced-apart apertures which register with the apertures in the tang 15 of the shovel and a pair of bolts 17 are passed through the registering apertures and provided with nuts 18 at the rear side of the shank to secure the tang to the shank in operative position at the front side of the shank.

This shovel, when operated with the bottom of its side walls substantially horizontal and disposed somewhat below the surface of the soil, as illustrated in Figure 1, raises the surface of the soil through which it passes and turns some of the soil outwardly to provide a shallow furrow with a ridge along each side of the furrow.

A pair of apertured lugs 20 extend rearwardly, one from the rear end of each inwardly and upwardly-inclined side wall 13 of the shovel, and are bent so that their rearward portions are disposed substantially in a common plane which plane is substantially horizontal when the shovel is in operative position, and disposed somewhat above the upper edges 21 of the side walls 13. The upper edges 21 of the side walls are substantially parallel to the lower edges and are substantially horizontal when the shovel is in operative position.

Each wing 11 comprises an elongated metal bar having a narrow, elongated cross-sectional shape. Each bar is provided near its forward end with an apertured lug 22 extending laterally inwardly from the bottom edge of the bar and disposed substantially perpendicular to the width of the latter. Respective bolts 23 extending through corresponding lugs 20 and 22 operatively connect the wings 11 to the shovel 10.

Each wing bar also comprises a straight portion 24 extending rearwardly from the front end of the bar at which the lug 22 is provided with the upper edge thereof tapered from the rear end to the front end of said straight portion, and a rear portion 25 disposed at an obtuse angle to the straight front portion 24 and extending from the rear end of the straight portion to the rear end of the bar.

When the wings 11 are properly attached to the shovel 10, the straight forward portions 24 of the wings are spaced apart and substantially parallel and the angularly-disposed rear parts 25 are rearwardly converging relative to each other. The wings are disposed on edge with their bottom edges somewhat above and substantially parallel to the top edges 21 of the side walls 13 of the shovel and substantially at the level of the original surface of the soil.

As this implement is moved along a middle between two rows of crop plants, the shovel 10 first raises the soil and moves some of it outwardly in opposite directions to provide a shallow furrow with a ridge along each side of the furrow. The wings 11, with their converging rearward portions trailing behind the shovel, contact the soil of these ridges and move most of this soil back into the furrow, thereby releveling the land behind the implement. With this arrangement, no definite furrow is left which will interfere with the operation of a tractor during a subsequent cultivating operation while, at the same time, any soil crust is thoroughly pulverized and any weeds growing in the middles between the crop rows are completely destroyed.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A cultivating implement comprising a triangular shovel and a pair of wings secured to said shovel one at each end of the rear edge of the latter and extending rearwardly from said shovel, said shovel comprising a thin-walled, triangular metal body having a pointed front end with side walls diverging symmetrically from said front end and inclined inwardly and upwardly relative to each other, a top wall extending rearwardly from said front end a distance less than the length of said side walls, and an apertured tang extending upwardly from the rear edge of said top wall substantially at the mid-length location of said rear edge, and said wings comprising thin-walled, elongated metal bars disposed on edge and each having at its front end an apertured lug projecting inwardly from its lower edge for attaching the bar to said shovel, each of said bars also having a straight portion extending rearwardly from said front end and a portion disposed at an obtuse angle to said straight portion and extending from the rear end of the straight portion to the rear end of the bar, said wings being attached to said shovel so that said angularly-disposed portions are rearwardly converging and said wings are adjustable toward and away from each other and the bottom edges of said wings are disposed slightly above and substantially parallel to the upper edges of the side walls of said shovel.

RAYMOND PORTER.

REFERENCES CITED

The following references are of record in the file of this patent:

UNITED STATES PATENTS

| Number | Name | Date |
|---|---|---|
| 422,718 | Cameron | Mar. 4, 1890 |
| 482,226 | Cheney et al. | Sept. 6, 1892 |
| 710,378 | Sweet | Sept. 30, 1902 |
| 1,017,942 | Wright | Feb. 20, 1912 |